US011099794B2

(12) United States Patent
Takahashi

(10) Patent No.: US 11,099,794 B2
(45) Date of Patent: Aug. 24, 2021

(54) PRINTING APPARATUS, CONTROL METHOD, AND STORAGE MEDIUM TO DETERMINE SHEET STORAGE STATUS

(71) Applicant: CANON KABUSHIKI KAISHA, Tokyo (JP)

(72) Inventor: Yasuhiro Takahashi, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/443,693

(22) Filed: Jun. 17, 2019

(65) Prior Publication Data
US 2019/0391765 A1 Dec. 26, 2019

(30) Foreign Application Priority Data
Jun. 20, 2018 (JP) .............................. JP2018-116665

(51) Int. Cl.
*G06F 3/12* (2006.01)
(52) U.S. Cl.
CPC ............ *G06F 3/121* (2013.01); *G06F 3/1235* (2013.01); *G06F 3/1256* (2013.01)
(58) Field of Classification Search
None
See application file for complete search history.

(56) References Cited

U.S. PATENT DOCUMENTS

| 7,002,702 | B1* | 2/2006 | Machida | H04N 1/00416 358/1.13 |
| 2009/0009803 | A1* | 1/2009 | Takeuchi | H04N 1/00408 358/1.15 |
| 2016/0216927 | A1* | 7/2016 | Fujii | G06F 3/1292 |
| 2016/0371039 | A1* | 12/2016 | Mizuno | G06F 3/1215 |

FOREIGN PATENT DOCUMENTS

JP 2000-211772 A 8/2000

* cited by examiner

*Primary Examiner* — Lennin R Rodriguezgonzales
(74) *Attorney, Agent, or Firm* — Canon U.S.A., Inc. IP Division

(57) ABSTRACT

The present disclosure enables to display a paper-out error immediately in the middle of printing images of scanner-read originals. A control method for a printing apparatus that includes a scanner for reading originals, a printer for printing images of the originals read by the scanner, and a controller for selecting a printing paper storage unit storing printing paper on which the images are to be printed, the control method including counting a number of the originals, calculating, every time the number of the originals is counted, a number of printing paper sheets for printing the images of the read originals based on the counted number of the originals, and displaying an error message when the calculated number exceeds the number of printing paper sheets stored in the selected printing paper storage unit.

12 Claims, 6 Drawing Sheets

PRINTING APPARATUS, CONTROL METHOD, AND STORAGE MEDIUM TO DETERMINE SHEET STORAGE STATUS

BACKGROUND

Field of the Disclosure

The present invention disclosure generally relates to printing and, more particularly, to a printing apparatus that can display an error based on a number of printing paper sheets stored in a printing paper storage unit of the printing apparatus and a number of printing paper sheets for printing, and to a control method and a storage medium.

Description of the Related Art

In a conventional image forming apparatus such as a copying machine, when paper in a printing paper storage unit runs out during printing of a scanned original or received print data, a screen to urge a user to replenish the printing paper holding unit with paper is displayed on an operation unit, notifying the user to that effect. However, when the user is notified of a need of replenishment of paper at a timing when a paper-out condition occurs, the user thereafter has to prepare printing paper for the replenishment, which results in a poor working efficiency. In addition, there can be a case where printing has already been interrupted due to paper-out condition when a user comes to a copying machine to take a product expecting that the printing has been finished.

Japanese Patent Application Laid-Open No. 2000-211772 discloses a method used in printing using a printer driver in which the number of printing paper sheets held in a printing paper holding unit of a copying machine is acquired in advance, and when the number falls below a number of printing paper sheets for the printing, a user is notified of a shortage of printing paper.

However, although disclosing printing using a printer driver (hereafter, referred to as PDL printing), Japanese Patent Application Laid-Open No. 2000-211772 does not disclose printing a scanned original (hereafter, referred to as copying).

Copying differs from PDL printing in a timing at which the number of printing paper sheets for the printing is found. More specifically, in PDL printing, a printer driver can grasp the number of pages for print data before giving a printing instruction to a copying machine. Therefore, by comparison of the number with a number of paper sheets in a printing paper holding unit, a user can be notified in advance of whether a paper-out condition will occur. In contrast, in copying, how many printing paper sheets for printing can be determined only after all originals have been scanned. This involves countermeasures according to an idea different from that of the PDL printing.

SUMMARY

To achieve the above objective, a printing apparatus according to an embodiment of the present disclosure has the following configuration.

A printing apparatus including: a scanner configured to read a plurality of originals; a printer configured to print images of the originals read by the scanner; a controller configured to select a printing paper storage unit storing printing paper on which the images are to be printed; a counter configured to count a number of the originals; and a display configured to calculate, every time the counter counts the number of the originals, a number of printing paper sheets for printing the images of the originals read by the scanner based on the number of the originals counted by the counter, and to display an error message in a case where the calculated number exceeds the number of printing paper sheets stored in the printing paper storage unit selected by the controller.

Further features of the present disclosure will become apparent from the following description of exemplary embodiments with reference to the attached drawings.

DESCRIPTION OF THE EMBODIMENTS

Various exemplary embodiments, features, and aspects of the present disclosure will now be described in detail in accordance with the accompanying drawings.

Hereafter, embodiments for carrying out the present disclosure will be described below in detail as an example with reference to the accompanying drawings. Note that constituent components described in the embodiments should not be construed as limiting on the scope of the present disclosure thereto but rather as illustrative only.

As examples of an image forming apparatus, the following embodiments describe examples of applying the present disclosure to an image forming apparatus having a copying function, such as a copying machine and a printer.

Embodiment 1

Embodiment 1 of the present disclosure will be described below with reference to the drawings.

Figure 1:
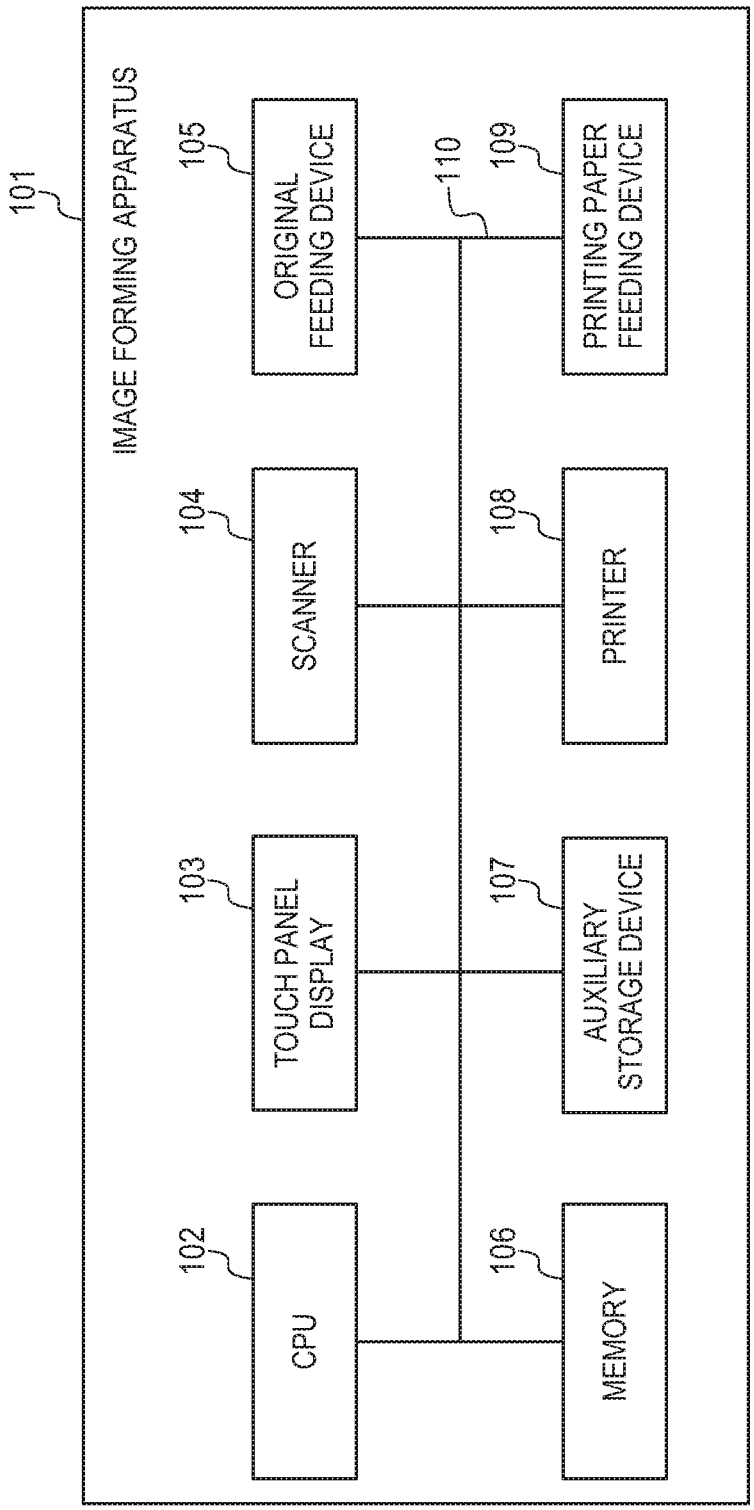
FIG. 1 is a block diagram illustrating a schematic configuration of an image forming apparatus according to an embodiment of the present disclosure.

FIG. 1 is a block diagram illustrating a schematic hardware configuration of an image forming apparatus according to Embodiment 1 of the present disclosure. An image forming apparatus 101 includes a central processing unit (hereafter, referred as to a "CPU") 102, a touch panel display 103, a scanner 104, an original feeding device 105, a printer 108, a printing paper feeding device 109, a memory 106, and an auxiliary storage device 107. These constituent components are connected to one another by an internal bus 110.

The CPU 102, which may include one or more processors, one or more memories, circuitry, or a combination thereof, may be configured to execute a program loaded in the memory 106 and to control various kinds of devices in the image forming apparatus 101. The touch panel display (operation unit) 103 as a notification unit or a display unit can display a screen to provide information such as a message to a user and can display a screen to receive a key input by a user, that is, a screen to allow the user to input an instruction. The scanner 104 is configured to irradiate an original with light using a light source and to form a reflected image on a solid-state image sensor using lenses. The solid-state image sensor generates a read image signal having a predetermined resolution (e.g., 600 dpi) and a predetermined density level (e.g., 8 bits) and forms, from the read image signal, a scanned image that is made up of raster data. The original feeding device 105 is configured to convey an original to the scanner 104.

The printer 108 is configured to function as an image forming unit that prints a scanned image loaded in the memory 106 onto a printing paper. The printing paper feeding device 109 is configured to convey a printing paper sheet to the printer 108. The memory 106 is configured to serve as a place for loading a program to be executed by the CPU 102 and capable of holding data to be used by a program. The auxiliary storage device 107 is made up of a mass storage device such as a hard disk drive and configured to save a scanned image and hold an application program to be executed by the image forming apparatus 101. The CPU 102 is configured to load such an application program into the memory 106 and executes the application program.

Figure 2:
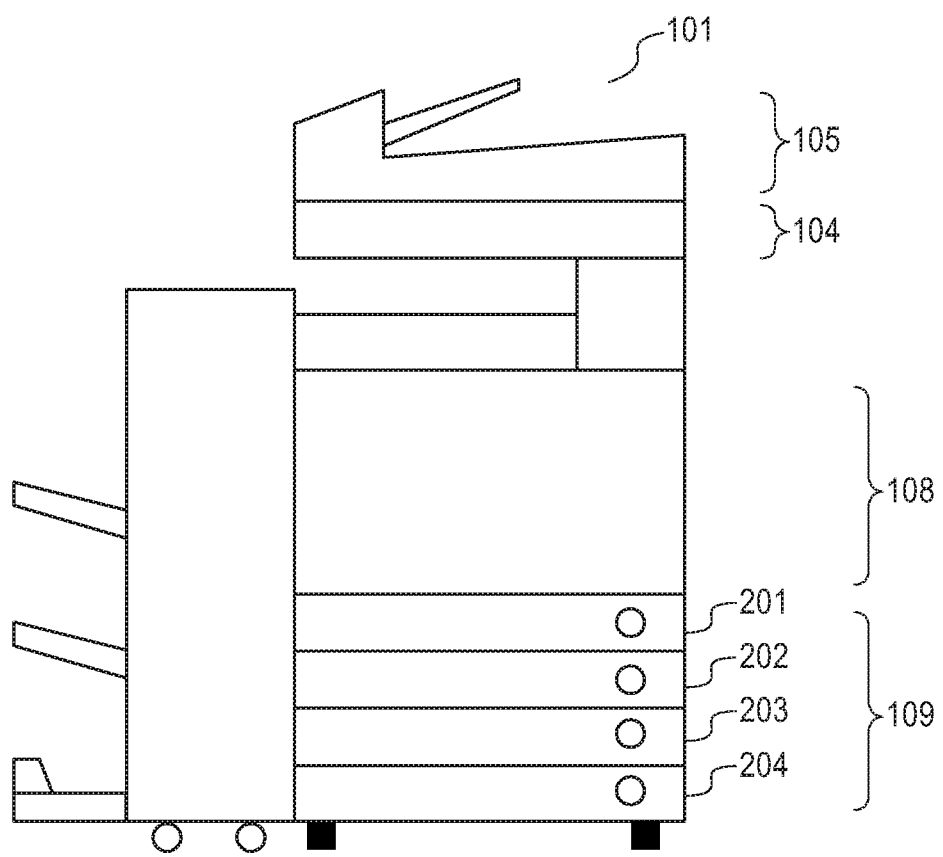
FIG. 2 is an external view of the image forming apparatus.

FIG. 2 is an external view of the image forming apparatus 101. In the image forming apparatus 101, the scanner 104 is disposed above the printer 108. The printing paper feeding device 109 includes printing paper holding units (hereafter, referred to as "paper feeding cassettes") 1 to 4 (201 to 204) each of which is capable of holding up to a predetermined number of, for example 500, printing paper sheets. The numbers of printing paper sheets held by the paper feeding cassettes (hereafter, referred to also as "remaining printing paper amount") are measured and managed by the CPU 102 according to a method described below.

<Method for Measuring a Remaining Printing Paper Amount>

An example of a method by the CPU 102 for measuring remaining printing paper amounts in the paper feeding cassettes 201 to 204 will be described.

For each of the paper feeding cassettes 201 to 204, the CPU 102 determines that the paper feeding cassette is fully loaded with printing paper when a sensor (not illustrated) included in the paper feeding cassette detects that a predetermined number of printing paper sheets are loaded. That is, in this case, when the sensor detects that 500 printing paper sheets are loaded on a paper feeding cassette, 201 for example, capable of accommodating 500 printing paper sheets, the CPU 102 determines that the paper feeding cassette 201 is fully loaded with printing paper. The CPU 102 stores information indicating that the 500 printing paper sheets are present in the paper feeding cassette 201, in the auxiliary storage device 107.

Thereafter, for each of the paper feeding cassettes, every time printing paper is discharged from the paper feeding cassette, the CPU 102 subtracts the number of discharged printing paper sheets from the number of printing paper sheets indicated by the information on the corresponding paper feeding cassette stored in the auxiliary storage device 107. For example, in a case where 20 printing paper sheets are discharged from the paper feeding cassette 201, information indicating that there are 480 printing paper sheets are present in the paper feeding cassette 201 is stored in the auxiliary storage device 107.

The CPU 102 grasps in this manner the information on the number of printing paper sheets present in each of the paper feeding cassettes.

<Copy Process Using Remaining Printing Paper Amount>

Next, a copy process using a remaining printing paper amount according to the present embodiment will be described. Here, to describe details of the process specifically, it is assumed that information on an original, copy settings set by a user, and statuses of the paper feeding cassettes are as given in Table 1 to Table 3, respectively. The copy settings include a setting for scanning the original, a setting for printing on printing paper, an instruction of image arrangement on printing paper such as page layout (arranging multiple originals on a single printing paper sheet), and a setting for the number of copies.

TABLE 1

| Original size | A4 |
| Number of originals | 20 |

TABLE 2

| Scan setting | Single-sided scan |
| Print setting | Single-sided print |
| Number of copies | 50 |

TABLE 3

| Paper feeding cassette | Sheet size | Remaining sheet amount |
| --- | --- | --- |
| Paper feeding cassette 1 (201) | A4 | 300 |
| Paper feeding cassette 2 (202) | A4 | 500 |
| Paper feeding cassette 3 (203) | A3 | 200 |
| Paper feeding cassette 4 (204) | — | 0 |

A status of the paper feeding cassette illustrated in Table 3 will be additionally described with reference to the paper feeding cassette 1 (201) and the paper feeding cassette 4 (204) as an example. A size of printing paper held in the paper feeding cassette 1 (201) is A4, and its remaining printing paper amount is 300. The remaining printing paper amount is measured by the CPU 102. In contrast, the remaining printing paper amount of the paper feeding cassette 4 (204) is zero, which indicates that the paper feeding cassette 4 holds no printing paper sheets.

Figure 3:
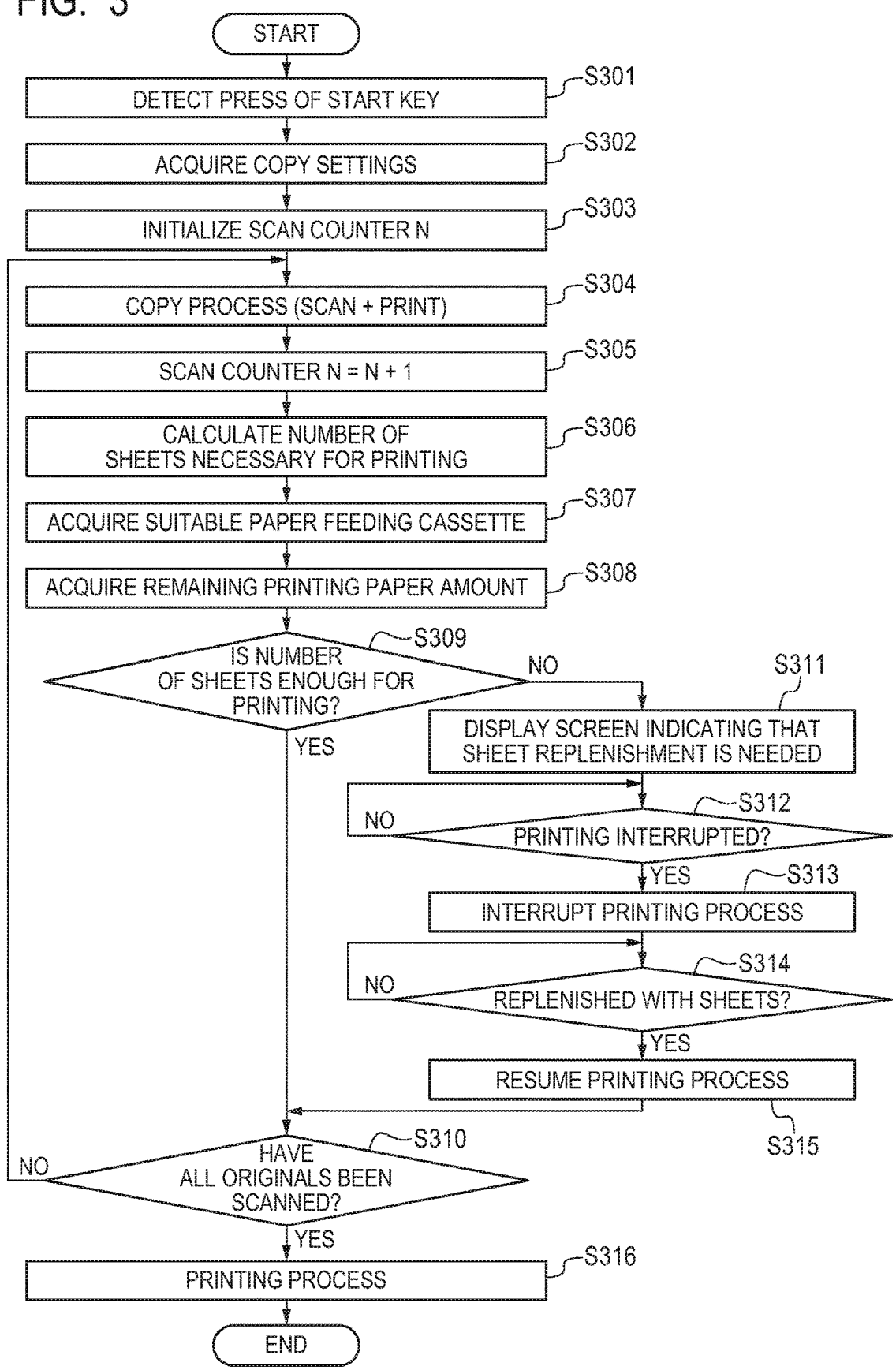
FIG. 3 is a flowchart used for describing a copy process in Embodiment 1.

Next, a copy process with the settings given in the above Table 1 to Table 3 will be described with reference to the flowchart illustrated in FIG. 3. The program according to this flowchart that is to run on the image forming apparatus 101 is stored in, for example, the auxiliary storage device 107 illustrated in FIG. 1, read and loaded into the memory 106, and executed by the CPU 102. This holds true for the other flowcharts to be described later. In addition, reference character S indicates a step in the following description.

Here, a case where a user puts a user 20 A4-sized originals in the original feeding device 105, sets 50 as the number of copies using the touch panel display 103, and presses a copy start key will be described.

Upon detecting via the touch panel display 103 that the copy start key is pressed (S301), the CPU 102 starts the copy process. In S302, the CPU 102 acquires the copy settings set by the user (equivalent to the settings given in Table 2). In S303, the CPU 102 initializes a scan counter N used for counting the number of scans to zero.

Next, in S304, the CPU 102 instructs the scanner 104 to scan the originals and instructs the printer 108 to print scanned images obtained by the scanner 104 onto printing paper sheets. In this example, since the size of the original is A4, the CPU 102 determines that the paper feeding cassette 1 (201) holding printing paper of the same size is a paper feeding cassette suitable for the printing, and instructs the printing paper feeding device 109 to convey printing paper to the printer 108.

At this point, the paper feeding cassette 2 (202) holds printing paper of the A4 size and therefore may be the suitable paper feeding cassette. However, as compared with the paper feeding cassette 1 (201), a paper conveying path from the paper feeding cassette 2 (202) to the printer 108 is slightly long, and the CPU 102 therefore selects the paper feeding cassette 1 preferentially.

Every time a printing paper sheet from the paper feeding cassette 1 (201) is subjected to the printing, the CPU 102 subtracts one from the number of sheets in the paper feeding cassette 1 (201) stored in the auxiliary storage device 107. This means that the CPU 102 counts in S304 the number of printing paper sheets already subjected to the printing.

Next, in S305, every time the scanner 104 scans an original, the CPU 102 increment the scan counter N by one. In S306, the CPU 102 calculates a number of printing paper sheets for the printing based on the scan counter N, the copy settings acquired in S302 (equivalent to the settings given in Table 2), and the number of printing paper sheets already subjected to the printing acquired in S304. In this case, the CPU 102 calculates the number of printing paper sheets for the printing based on the value of the scan counter N at this timing because the scanning of all the originals has not been finished.

That is, typically, a speed of reading an original by the scanner 104 is higher than a printing speed of the printer 108, and it is therefore often the case that a printing process is still underway when scanning of all originals is finished. In this example, since the number of copies is set at 50, the printing process is still underway also in this case when scanning of all the originals is finished.

For example, in a case where the value of the scan counter N acquired in S305 is 2, since the copy settings acquired in S302 include a setting of the number of copies being 50, the CPU 102 calculates 2×50=100 in S306 as the number of printing paper sheets for the printing. By subtracting in S306 the number of printing paper sheets already subjected to the printing acquired in S304 from the number of the sheets for the printing, the CPU 102 can calculate the number of sheets for the printing at this timing. For example, when 10 printing paper sheets are already subjected to the printing, 90 (=100−10) is the number of sheets for the printing at this timing.

Next, in S307, the CPU 102 can select a plurality of paper feeding cassettes suitable for the printing from among the paper feeding cassettes 201 to 204 of the printing paper feeding device 109. In this example, the paper feeding cassette 1 (201) and the paper feeding cassette 2 (202) holding printing paper of the A4 size, the same as the size of the originals, are the paper feeding cassettes suitable for the printing.

Next, in S308, the CPU 102 calculates the total number of printing paper sheets for the suitable paper feeding cassettes, which are acquired in S307. In this example, since 10 sheets have already been subjected to the printing from the paper feeding cassette 1 (201), a current state of the remaining printing paper amounts is a state given in Table 4 shown below. That is, from Table 4, the total remaining printing paper amount of the paper feeding cassette 1 (201) and the paper feeding cassette 2 (202) is 790.

TABLE 4

| Paper feeding cassette | Sheet size | Remaining sheet amount |
|---|---|---|
| Paper feeding cassette 1 (201) | A4 | 290 |
| Paper feeding cassette 2 (202) | A4 | 500 |
| Paper feeding cassette 3 (203) | A3 | 200 |
| Paper feeding cassette 4 (204) | — | 0 |

Next, in S309, the CPU 102 compares the number of sheets for printing determined in S306 with the total remaining printing paper amount of the suitable paper feeding cassettes calculated in S308. In a case where the result of the comparison shows that the total remaining printing paper amount of the suitable paper feeding cassettes is more than the number of sheets for printing, the CPU 102 advances the process to S310.

Figure 4:
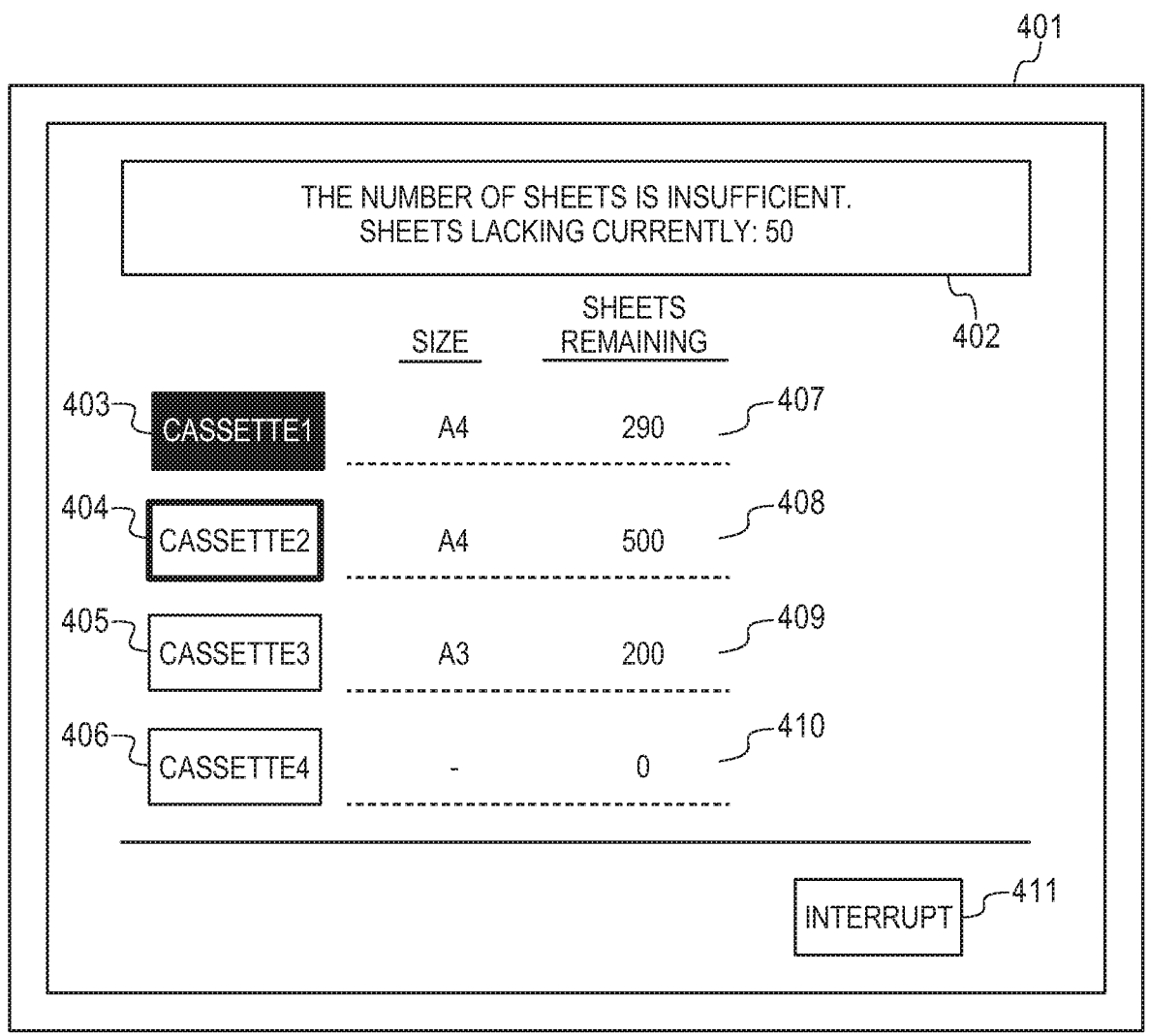
FIG. 4 is an example of a screen in Embodiment 1 notifying a user that replenishment of printing paper is needed.

In contrast, in a case where the total remaining printing paper amount of the suitable paper feeding cassettes is less than the number of sheets for printing, the CPU 102 advances the process to S311. In other words, in a case where the number of sheets for printing exceeds the total remaining printing paper amount of the suitable paper feeding cassettes, the CPU 102 advances the process to S311. In S313, the CPU 102 causes the touch panel display 103 to display a screen 401 notifying the user that replenishment of printing paper is needed, as illustrated in FIG. 4. In this example, the screen is first displayed in a case where the value of the scan counter N reaches 17. This is because, from Table 3, the total remaining printing paper amount of the paper feeding cassette 1 (201) and the paper feeding cassette 2 (202) at the start of the scan is 800, and a timing when printing paper sheets more than 800 becomes according to the copy settings in Table 2 is as given as Table 5 below.

TABLE 5

| Scan counter N | Sheets for printing |
|---|---|
| 15 | 15 × 50 = 750 |
| 16 | 16 × 50 = 800 |
| 17 | 17 × 50 = 850 |

In the screen 401, an area 402 having a display indicating a shortage of printing paper sheets in the paper feeding cassettes, areas 403 to 410 indicating the statuses of the paper feeding cassettes, and a button 411 to interrupt the printing process are disposed.

The areas 403 and 407 indicate the status of the paper feeding cassette 1 (201), the areas 404 and 408 indicate the status of the paper feeding cassette 2 (202), the areas 405 and 409 indicate the status of the paper feeding cassette 3 (203), and the areas 406 and 410 indicate the status of the paper feeding cassette 4 (204).

The display of the statuses of the paper feeding cassettes will be described more in detail. The area 403 has an inverted display, which indicates that the corresponding paper feeding cassette is a paper feeding cassette feeding sheets currently, and the area 404 has a thick-bordered box, which indicates that the corresponding paper feeding cassette is not feeding sheets but is a paper feeding cassette suitable for the printing. Additionally, the areas 407 to 410 display the sizes of printing paper held in the paper feeding cassettes 1 (201) to 4 (204) and the remaining printing paper amounts measured by the CPU 102, respectively. The interrupting button 411 is a button that enables the user to input an instruction for interrupting the printing process being in action, and to enable the user to perform replenishment of printing paper.

In S312, upon detecting that the interrupting button 411 is pressed by the user, the CPU 102 advances the process to S313, interrupting the printing process in action. The CPU 102 then advances the process to S314, waiting for the user to perform the replenishment of printing paper. Upon detecting that the replenishment of printing paper is performed by the user, the CPU 102 advances the process to S315 to restart the printing process. After the interrupting button 411 is pressed, the CPU 102 can clear the screen 401 between steps of S313 and S314.

The present embodiment is based on the premise that the replenishment of printing paper involves the interruption of the printing process. However, with a configuration in which a paper feeding cassette can be replenished with printing paper without the interruption of the printing process as long as the replenishment does not affect the conveyance of printing paper, the replenishment of printing paper may be performed during the printing process.

After that, the CPU 102 determines in S310 whether the scanning of all the originals has been finished, and when determining that the scanning has not been finished, the CPU 102 advances the process to S304 to continue the scanning process for the remaining originals. That is, the CPU 102 performs the scanning process and the printing process for the next originals, performing S304 and the subsequent steps.

When determining that the scanning of all the originals has been finished, the CPU 102 advances the process to S316 to perform the printing process remaining. When the printing of all the originals is finished, the CPU 102 finishes the copy process.

In the above example, in a case where the interrupting button 411 is not pressed by the user in S312, the CPU 102 interrupts the process until the interrupting button is pressed. The CPU 102 may be configured to continue the printing process until the interrupting button is pressed. In this case, however, a paper-out condition will occur in the middle of the printing process. A conventional technique for the paper-out condition can be adopted in this case and therefore will not be described, but the operation of the process is roughly as follows.

That is, upon detecting that a remaining amount of printing paper in the paper feeding cassettes suitable for the printing (in this example, the paper feeding cassette 1 and the paper feeding cassette 2) is zero, the CPU 102 instructs the printer 108 to interrupt the printing process.

Then, upon detecting that the user replenishes the paper feeding cassettes with printing paper, the CPU 102 instructs the printer 108 to restart the printing process.

As described above, according to the present embodiment, a user can be notified immediately of whether replenishment of printing paper is necessary before an occurrence of a paper-out condition in a copy process using a scanner. That is, in every scan, the number of printing paper sheets for the printing is determined based on the value of the scan counter, and when replenishment of printing paper becomes necessary at this timing, a display to that effect is performed. Therefore, the user can prepare printing paper for the replenishment even during the scanning. In addition, when no display is performed at the time when the scan is finished and it turns out that no replenishment of printing paper will occur, the user is allowed to leave the image forming apparatus and to perform another task until the printing is finished. In the present embodiment, printing is started before the number of printing paper sheets for the printing is determined, that is, before scanning of all originals is finished. In other words, the printing of image data onto printing paper can be performed in concurrent with an operation of the scan by the scanner, which therefore enables the entire copy process to be finished swiftly.

Embodiment 2

In Embodiment 1, the case where the printing is started before the number of printing paper sheets for the printing is determined, that is, before scanning of all originals is finished, is described. This is to avoid a situation where delaying the start of the printing process until the determination of the number of printing paper sheets for the printing delays the entire copy process accordingly.

However, in a case where the CPU 102 determines that starting the printing process earlier will cause printing paper to run out during the printing process, the printing process has to be interrupted for replenishment of printing paper and has to be restarted after the replenishment of printing paper. When this interruption and restart is performed smoothly, no problem will arise, but some printers do not allow an immediate restart, which may cause a long downtime. Hence, the present embodiment is configured to start a printing process after the determination of the number of printing paper sheets for the printing.

Figure 5:
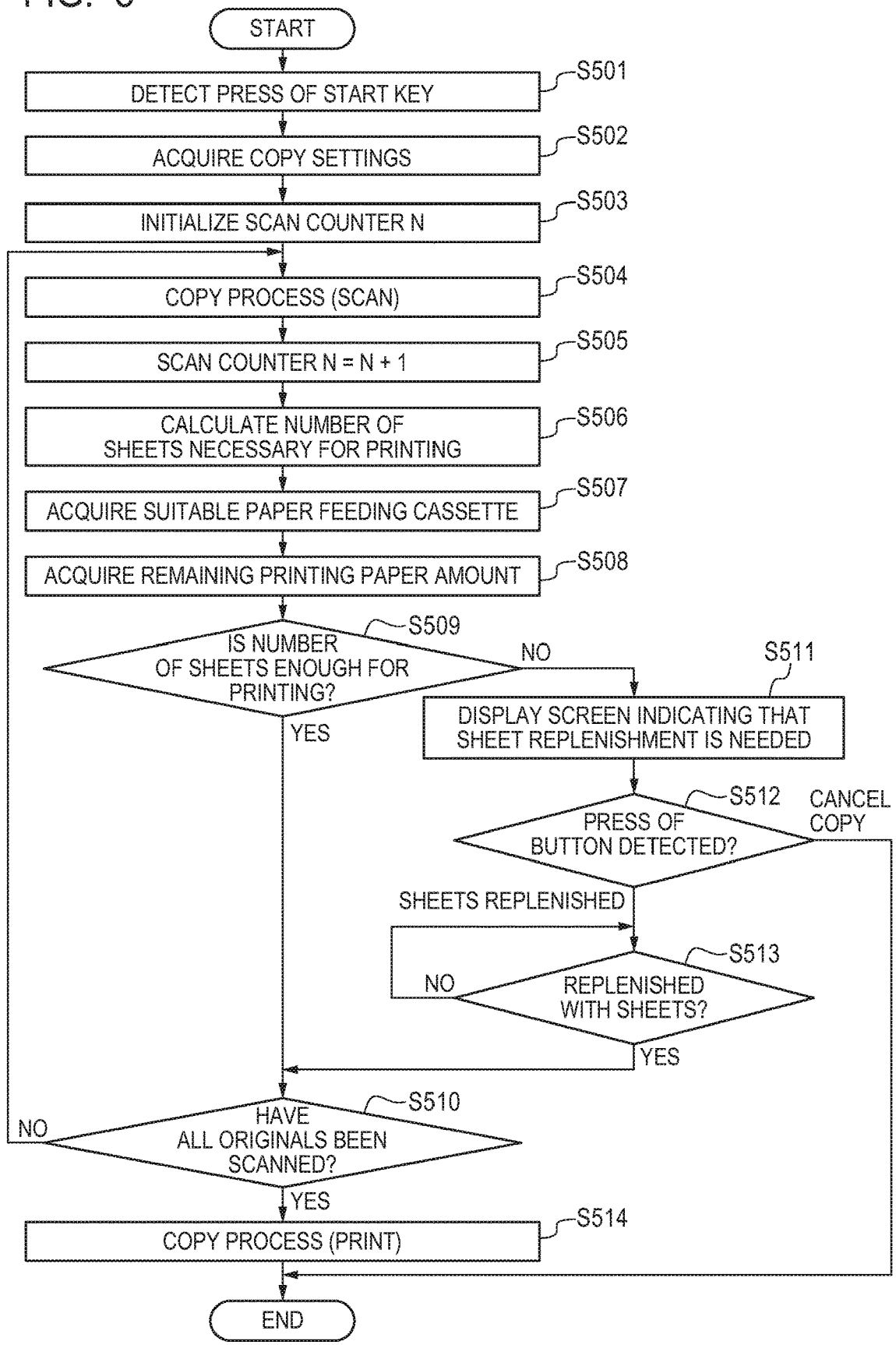
FIG. 5 is a flowchart used for describing a copy process in Embodiment 2.

A copy process using a remaining printing paper amount according to the present embodiment will be described with reference to a flowchart illustrated in FIG. 5. The configuration of the image forming apparatus 101 in the present embodiment is the same as the configuration in Embodiment 1. In addition, to describe details of the process specifically, it is assumed that information on an original, copy settings set by a user, and statuses of the paper feeding cassettes are the same as given in Table 1 to Table 3 of Embodiment 1.

A user puts a user 20 A4-sized originals in the original feeding device 105, sets the number of copies (50) using the touch panel display 103, and presses the copy start key. Upon detecting via the touch panel display 103 that the copy start key is pressed (S501), the CPU 102 starts the copy process. In S502, the CPU 102 acquires the copy settings set by the user (equivalent to the settings given in Table 2).

In S503, the CPU 102 initializes a scan counter N used for counting the number of scans to zero. Next, in S504, the CPU 102 instructs the scanner 104 to scan the originals. In S505, every time the scanner 104 scans an original, the CPU 102 increment the scan counter N by one. In S506, the CPU 102 calculates a number of printing paper sheets for the printing based on the scan counter N and the copy settings acquired in S502 (equivalent to the settings given in Table 2).

It should be noted in this case that the CPU 102 is to calculate the number of printing paper sheets for the printing based on the value of the scan counter N at this timing because the scanning of all the originals has not been finished. For example, in a case where the value of the scan counter N is 2, since the copy settings acquired in S502 include a setting of the number of copies being 50, the CPU 102 calculates 2×50=100 in S506 as the number of printing paper sheets for the printing.

Next, in S507, the CPU 102 determines all paper feeding cassettes suitable for the printing from among the paper feeding cassettes 201 to 204 of the printing paper feeding device 109. In this example, the paper feeding cassette 1 (201) and the paper feeding cassette 2 (202) holding printing paper of the A4 size, the same as the size of the originals, are determined as the paper feeding cassettes suitable for the printing.

Next, in S508, the CPU 102 calculates the total number of printing paper sheets in the suitable paper feeding cassettes, which are acquired in S507. In this example, from Table 3, the total remaining printing paper amount of the paper feeding cassette 1 (201) and the paper feeding cassette 2 (202) is 800.

Next, in S509, the CPU 102 compares the number of sheets for printing determined in S506 with the total remaining printing paper amount of the suitable paper feeding cassettes calculated in S508. In a case where results of the comparison show that the total remaining printing paper amount of the suitable paper feeding cassettes is equal to or larger than the number of sheets for printing, the CPU 102 advances the process to S510.

Figure 6:
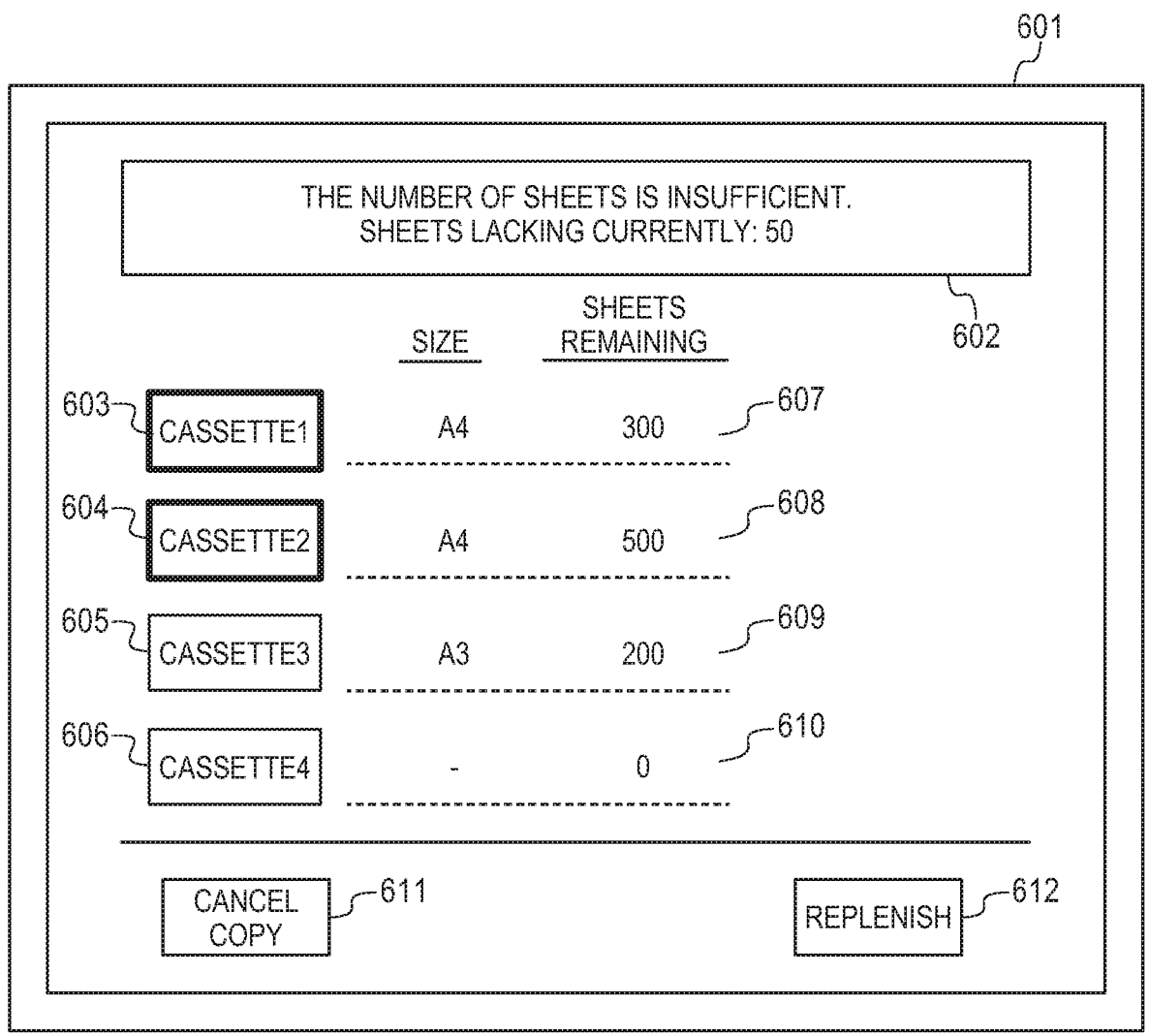
FIG. 6 is an example of a screen in Embodiment 2 notifying a user that replenishment of printing paper is needed.

In contrast, in a case where the total remaining printing paper amount of the suitable paper feeding cassettes is less than the number of sheets for printing, the CPU 102 advances the process to S511, causing the touch panel display 103 to display a screen 601 notifying the user that replenishment of printing paper is needed, as illustrated in FIG. 6. In this example, the screen is first displayed in a case where the value of the scan counter N reaches 17, as in Embodiment 1.

In the screen 601, an area 602 having a display indicating a shortage of printing paper sheets in the paper feeding cassettes, areas 603 to 610 indicating the statuses of the paper feeding cassettes, a button 611 to cancel the copying, and a button 612 to allow the replenishment of printing paper are disposed.

The areas 603 and 607 indicate the status of the paper feeding cassette 1 (201), the areas 606 and 608 indicate the status of the paper feeding cassette 2 (202), the areas 605 and 609 indicate the status of the paper feeding cassette 3 (203), and the areas 606 and 610 indicate the status of the paper feeding cassette 4 (204).

The display of the statuses of the paper feeding cassettes will be described more in detail. Areas 603 and 604 each have a thick-bordered box, which indicates that the corresponding paper feeding cassettes are suitable for the printing. Additionally, the areas 607 to 610 display of the sizes of printing paper held in the paper feeding cassettes 1 (201) to 4 (204) and the remaining printing paper amounts measured by the CPU 102, respectively.

A difference of the screen 601 from the screen 401 illustrated in FIG. 4 in Embodiment 1 is that the printing process is not started yet in this stage. Therefore, the remaining printing paper amount of the paper feeding cassette 1 indicated in the area 607 is still 300.

Upon detecting in S512 that the printing paper replenishment button 612 is pressed by a user, the CPU 102 advances the process to S513, waiting for the user to perform the replenishment of printing paper. Upon detecting that the replenishment of printing paper is performed by the user, the CPU 102 advances the process to S510.

In contrast, upon detecting in S512 that a copy cancellation button 611 is pressed by the user, the CPU 102 cancels the printing and terminates the entire copy process.

When determining in S510 that the scanning of all the originals has not been finished, the CPU 102 advances the process to S504 to continue the scanning process for the remaining originals. That is, the CPU 102 performs the scanning process for the next originals, performing S504 and the subsequent steps.

In S510, when determining that the scanning of all the originals has been finished, the CPU 102 advances the process to S514. In S514, the CPU 102 instructs the printer 108 to perform the printing process. Then, when the printing process for all the originals is finished, CPU 102 finishes the copy process.

After the copy cancellation button 611 or the printing paper replenishment button 612 is pressed, the CPU 102 can clear the screen 601 between steps of S512 and S513.

As described above, also according to the present embodiment, a user can be notified immediately of the necessity of replenishment of printing paper before an occurrence of a paper-out condition in a copy process using a scanner. That is, in every scan, the number of printing paper sheets for the printing is determined based on the value of the scan counter, and when replenishment of printing paper becomes necessary at this timing, a display to that effect is performed. Therefore, the user can prepare printing paper for the replenishment even during the scanning. In addition, when no display is performed at the time when the scan is finished and it turns out that no replenishment of printing paper will occur, the user is allowed to leave the image forming apparatus and to perform another task until the printing is finished. In the present embodiment, whether replenishment of printing paper is necessary is displayed at a time when a scan is finished, and the printing is thereafter started. Therefore, replenishment of printing paper can be prevented from occurring during the printing as in Embodiment 1.

That is, in any of the above embodiments, in a case where replenishment of printing paper is not needed at a timing when a scan is finished and the number of printing paper sheets for printing is determined, a display to that effect may be performed. The user is thereby allowed to leave the image forming apparatus and to perform another task until the printing is finished, at a time when the scanning is finished and it turns out that no replenishment of printing paper will occur.

As described above, according to the present disclosure, the image forming apparatus includes an image forming unit (108) configured to print image data obtained from the scanner onto printing paper and a display unit (103) configured to display a message. The image forming apparatus further includes a management unit (the CPU 102, S304, S504), a selection unit (the CPU 102, S307, S507), and a control unit (the CPU 102, S306, S308 to S316, S506, S508 to S514). The image forming apparatus further includes the scan counter N that is counted up every scan of an original by the scanner (S305). The management unit is configured to manage the numbers of printing paper sheets stored in the plurality of printing paper holding units (201 to 204), and the selection unit is configured to select one or more printing paper holding units in which printing paper suitable for printing the image data is stored. The control unit is configured to calculate a number of sheets for printing image data obtained by the scanner based on the count value of the scan counter every time when the scan counter is counted up. The control unit is configured to display on the display unit a message indicating that replenishment of printing paper is needed in the case where the calculated number of sheets exceeds the number of sheets held in a printing paper holding unit selected by the selection unit (S311, S511).

The present disclosure can exert effects that include enabling a user to be notified immediately of whether replenishment of printing paper is necessary before an occurrence of a paper-out condition in a copy process using a scanner.

As seen from the above, exemplary embodiments of the present disclosure are described in detail, but the present disclosure is not limited to such specific embodiments, and various modifications and alterations may be made within the gist of the present disclosure as described and claimed herein.

OTHER EMBODIMENTS

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-116665, filed Jun. 20, 2018, which is hereby incorporated by reference herein in its entirety.

What is claimed is:

1. An image processing apparatus comprising:
a scanner configured to scan a plurality of document sheets; and
a printer configured to print images of the document sheets scanned by the scanner on print sheets stored in a print sheet storage unit,
wherein the image processing apparatus determines, every time the scanner scans one document sheet, whether print sheets stored in the print sheet storage unit are enough for printing images of the scanned document sheets, and
wherein, in a state that one or more document sheets remain on the scanner, the image processing apparatus is able to perform, to a user, predetermined notification which is based on a determination result of the determining.

2. The image processing apparatus according to claim 1, further comprising:
a display,
wherein the display performs the predetermined notification which is based on the determination result.

3. The image processing apparatus according to claim 2, wherein
the display displays an object for stopping printing by the printer based on the determination result.

4. The image processing apparatus according to claim 1, further comprising:
a controller,
wherein the controller selects a plurality of print storage units which stores the print sheets to be used for printing the images of the scanned document sheets, and
in a case where the controller selects the plurality of print sheet holding units, the image processing apparatus compares a total of numbers of print sheets stored in all of the selected print sheet storage units with a number of print sheets to be used for printing images which is images of the scanned document sheets and which is not yet printed, and the image processing apparatus performs the predetermined notification which is based on a result of the comparison.

5. The image processing apparatus according to claim 1, wherein the printer performs printing concurrently with scanning by the scanner.

6. The image processing apparatus according to claim 1, wherein the predetermined notification includes a message to urge a user to perform replenishment of a print sheet.

7. The image processing apparatus according to claim 1, wherein the image processing apparatus performs the predetermined notification in a case where the sheets stored in the print sheet storage unit are enough for printing images of the scanned document sheets even if the print sheets stored in the print sheet storage unit is not empty.

8. A control method for an image processing apparatus that comprises a scanner configured to scan a plurality of document sheets, and a printer configured to print images of the document sheets scanned by the scanner on print sheets stored in a print sheet storage unit,
wherein the image processing apparatus determines, every time the scanner scans one document sheet, whether print sheets stored in the print sheet storage unit are enough for printing images of the scanned document sheets, and
wherein, in a state that one or more document sheets remain on the scanner, the image processing apparatus is able to perform, to a user, predetermined notification which is based on a determination result of the determining.

9. A non-transitory computer-readable storage medium that stores a program configured to cause a computer to perform a control method for an image processing apparatus that comprises a scanner configured to scan a plurality of document sheets, and a printer configured to print images of the document sheets scanned by the scanner on print sheets stored in a print sheet storage unit,
wherein the image processing apparatus determines, every time the scanner scans one document sheet, whether print sheets stored in the print sheet storage unit are enough for printing images of the scanned document sheets, and wherein, in a state that one or more document sheets remain on the scanner, the image processing apparatus is able to perform, to a user, predetermined notification which is based on a determination result of the determining.

10. An image processing apparatus comprising:

a scanner configured to scan a plurality of document sheets; and a printer configured to print images of the document sheets scanned by the scanner on print sheets stored in a print sheet storage unit, wherein the image processing unit determines, every time the scanner scans one document sheet, a number of print sheets to be used for printing images of the scanned document sheets based on a number of the document sheets which has been scanned by the scanner, and wherein the image processing apparatus performs predetermined notification in a case where a number of print sheets obtained by subtracting a number of print sheets already subjected to printing from the determined number exceeds a current number of print sheets stored in the print sheet storage unit.

11. The image processing apparatus according to claim 10, wherein the printer performs printing concurrently with scanning by the printer.

12. An image processing apparatus comprising:

a scanner configured to scan a plurality of document sheets; and a printer configured to print images of the document sheets scanned by the scanner on print sheets stored in a print sheet storage unit, wherein the image processing apparatus is able to perform, in a state that one or more document sheets remain on the scanner and one or more sheets are stored in the print storage unit, predetermined notification regarding a lack of print sheets to a user.

* * * * *